United States Patent [19]

Schwanemann

[11] 3,731,178
[45] May 1, 1973

[54] PROCESS AND APPARATUS FOR EFFECTING CONTROL OVER CONTROL SYSTEMS FOR NON-LINEAR CONTROL PROCEDURES

[75] Inventor: Manfred Schwanemann, Duesseldorf, Germany

[73] Assignee: Zellweger Ltd., Uster, Switzerland

[22] Filed: Jan. 27, 1971

[21] Appl. No.: 110,034

[30] Foreign Application Priority Data

Feb. 10, 1970 Switzerland..........................1873/70

[52] U.S. Cl.................................................318/620
[51] Int. Cl..............................................G05b 5/01
[58] Field of Search.................318/619–622; 323/93

[56] References Cited

UNITED STATES PATENTS

| | | | |
|---|---|---|---|
| 3,127,105 | 3/1964 | Nichols | 323/93 |
| 3,171,954 | 3/1965 | Stern | 318/620 |
| 3,242,407 | 3/1966 | Hansen | 318/619 |
| 3,273,035 | 9/1966 | Inderhees | 318/620 |
| 3,505,606 | 4/1970 | Werner | 318/619 |
| 3,510,738 | 5/1970 | Iversen | 318/620 |

Primary Examiner—Bernard A. Gilheany
Assistant Examiner—Thomas Langer
Attorney—Craig and Antonelli

[57] ABSTRACT

Process and apparatus for effecting control over control systems for non-linear control procedures wherein the amplification of the servo control amplifier in the main control system is adjusted in accordance with the control deviation by a secondary control system including a pair of chopper amplifiers responsive to the same input as the main control system for controlling a servo motor which drives respective feedback potentiometers controlling desired value generators connected to the respective chopper amplifiers and a control potentiometer for controlling the amplification of the servo control amplifier in the main control system.

7 Claims, 4 Drawing Figures

PROCESS AND APPARATUS FOR EFFECTING CONTROL OVER CONTROL SYSTEMS FOR NON-LINEAR CONTROL PROCEDURES

The invention relates to a process for effecting control over control systems for non-linear control operations, as well as to an apparatus for conducting the process.

In chemical process techniques and the fields associated therewith, it is often a requirement to maintain a certain condition in a control system constant by providing a desired nominal value and by selectively introducing an additive value thereto, wherein the resulting measured actual value will be present as a specific function of the condition in the system. This measured actual value can be entirely non-linear with respect to the condition in the system.

An example, in this connection, is the measurement of the concentration in bleaching baths by means of continuous titration. During continuous titration, a constant amount of sample is continuously withdrawn from the bath and mixed with a constant amount of titration agent. After a certain time of reaction, the redox potential measured in the mixture can be used as a measure of the concentration in the bath. The redox potential is obtained in the form of millivolt (mV) signal and is very strongly non-linear with respect to the concentration in the bath. FIG. 1 shows, as an example, the course of such a titration curve T. It can be seen therefrom that, in the middle of the curve (at $a$) a small change in concentration causes a very large change in the mV-signal. For this reason, it is desirable to maintain the system constant at this point, since the greatest degree of accuracy in the control thereof can be obtained in this way.

In a closed control circuit, the amplification of the control device must be adjusted in such a manner that stability is attained by the adjusted circuit amplification. However, in the case of an operating characteristic in accordance with the above-mentioned curve T, the amplification changes with each concentration value. This means that the control device must change its amplification constantly as the actual value approaches or moves away from the desired value.

There are various types of control devices available on the market, by means of which such control can be effected, but such devices operate, especially in the case of a non-linear characteristic, with a large degree of inaccuracy. These control devices convert the input signal (actual value) or the output signal (control value) by application of an oppositely acting non-linear function; however, only a unilateral conversion occurs. Functions exhibiting a bilateral deviation from the straight line cannot be processed, as is the case in the curve T shown in FIG. 1.

The present invention satisfies the need for improvement in this field. The invention relates to a process for controlling control systems for non-linear control operations, and is distinguished in that the amplifications of the control device are adjusted continuously and automatically in dependence on the control deviation.

The invention likewise relates to an apparatus for conducting the process and comprises an additional or secondary control system connected in parallel with the main control device, which further control system is composed of chopper amplifiers associated with a pair of desired value generators, the input signal of this secondary control system being in the same form as the control deviation applied to the first control device, and the output signals of this further control system being effective on a servomotor which adjusts the taps of two feedback signal generators and the tap of a control adjusting unit, wherein the output of the control adjusting unit is returned as a control feedback signal to the main control device.

With reference to the figures, one embodiment of the present invention will be explained in detail for purposes of example. In the drawings.

Figure 2:
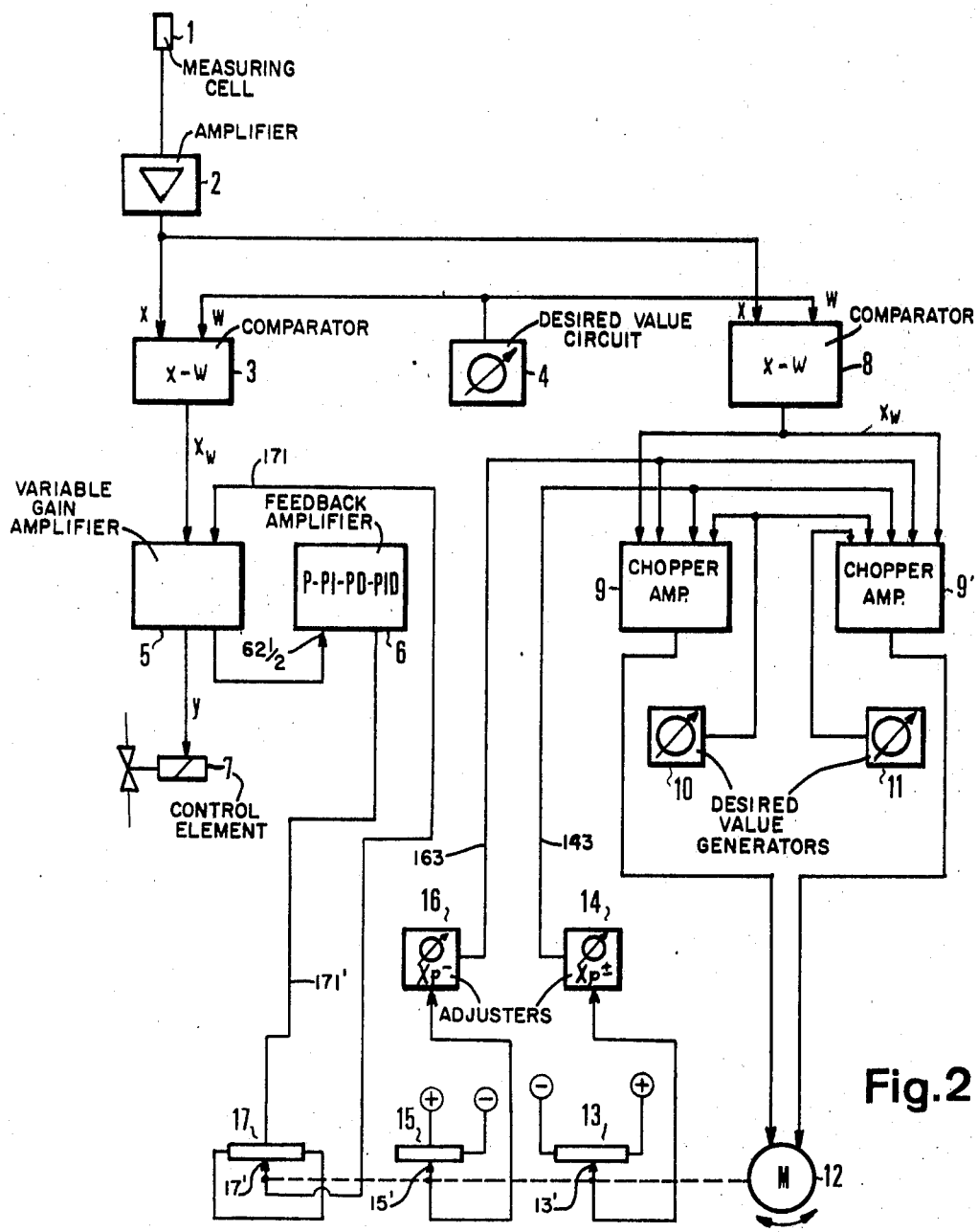
FIG. 2 shows schematically the circuit arrangement of a system according to this invention.

The millivolt signal produced in the measuring cell 1, as seen in FIG. 2, is amplified by means of an amplifier 2; the resulting d.c. current is compared in a comparator 3 with a first desired value 4; and the output control deviation $x_w$ of the comparator is applied to a variable-gain amplifier 5. The output of the variable-gain amplifier 5 controls a control element 7 in correspondence with the control deviation; this control element influences the control system by adding additives into the variable quantity monitored by the measuring cell 1. In this manner, the control circuit is closed.

In order to be able to impart to the variable-gain amplifier a certain behavior, such as P-behavior, PI-behavior, PD-behavior, or PID-behavior, the variable-gain amplifier 5 controls, in a conventional manner, a feedback amplifier 6, the output signal of which is applied back to the input of the variable-gain amplifier 5. The feedback amplifier 6 is adjusted, in its amplification (proportional behavior) to the steepest point within the amplification curve of the system.

In order to adjust the amplifications of the feedback amplifier 6 automatically, a second control unit becomes necessary. In this connection, the actual value $x$ and the desired value $w$ are applied to a further comparator 8, and the output of the comparator 8 is applied to two chopper amplifiers 9 and 9' as the control deviation $x_w$.

The switching points of these chopper amplifiers 9 and 9' can simultaneously to shifted over the control range by means of a second desired value generator 10 so that the correct working point of the amplifier can be determined. Furthermore, a switching point can additionally be varied by means of a third desired value generator 11 so that a switching difference is provided between the two chopper amplifiers 9 and 9'. The chopper amplifiers 9 and 9' control, with their output signals, a servomotor 12 for left-hand and right-hand rotation. This servomotor is coupled mechanically to a first feedback signal potentiometer 13, a second feedback signal potentiometer 15, and a third potentiometer 17. The variable resistance of the first feedback signal potentiometer 13 is applied, via an $x_p$-adjuster potentiometer 14, to the inputs of the two chopper amplifiers 9 and 9'. In this manner, the position of the servomotor 12 is compared with the control deviation $x_w$ and readjusted in case of a deviation. The magnitude of the rotary movement of the servomotor 12, until a compensation has been effected, depends on the adjustment of the $x_p$-adjuster 14.

Figure 1:
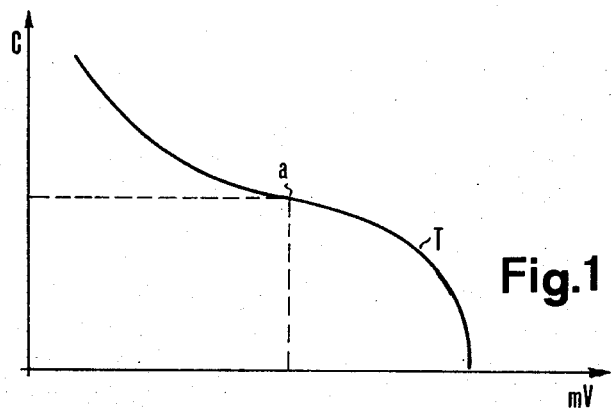
FIG. 1 shows, as an example for a non-linear control problem, the course of a titration curve.
Figure 3:
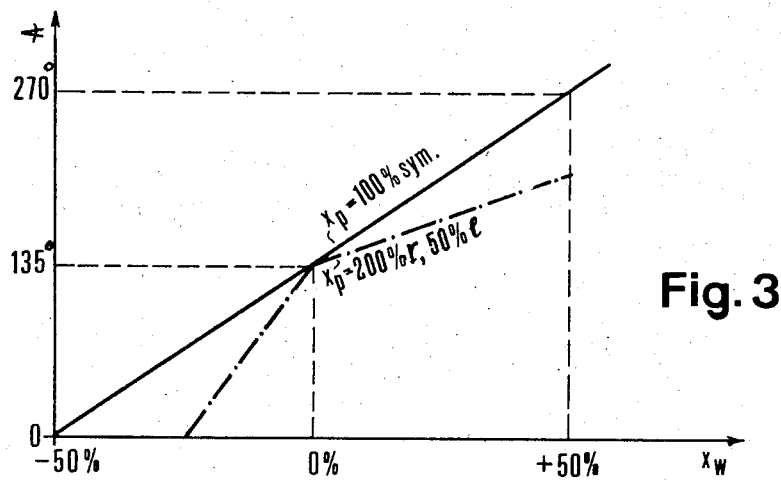
FIG. 3 is a diagram showing the dependence of a mechanical angular position on the control deviation.
Figure 4:
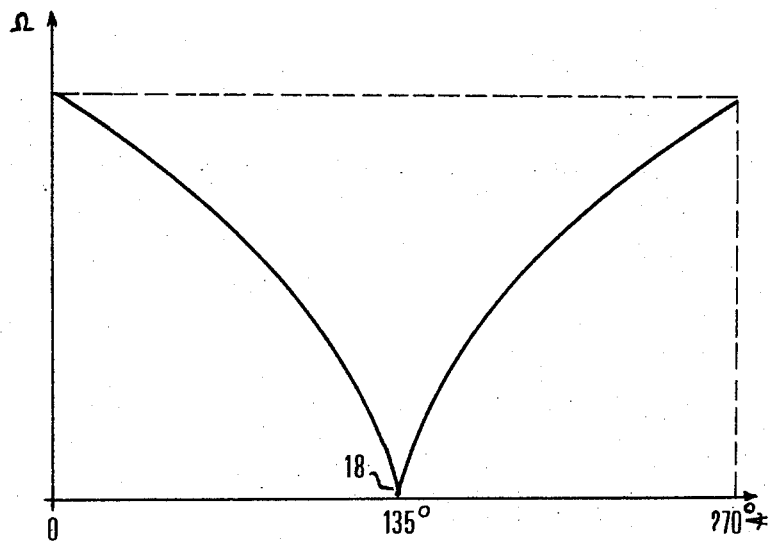
FIG. 4 is a diagram showing the characteristic resistance of a potentiometer in dependence on the angular position of its tapping point.

The second feedback signal potentiometer 15 has a central tap. The variable resistor is likewise effective on both inputs of the chopper amplifiers 9 and 9' by way of a second $x_p$-adjuster 16; however, this signal is only present in case of a negative or positive control deviation $x_w$. In this manner, the objective is attained that the servomotor 12 executes different rotary movements for negative as well as positive control deviations, and in case such deviations have the same magnitude. FIG. 3 shows the position of the servomotor in dependence on the control deviation $x_w$. A third potentiometer 17 is likewise driven by the servomotor 12. This potentiometer 17 also has a middle tap. The wiper is connected with the front and the end of the potentiometer; thus, a non-linear change in resistance occurs between the wiper and the middle tap during the operation of the servomotor 12. FIG. 4 shows the dependence of the resistance value on the position of the servomotor. This resistance curve, which has an inversion point at 18 and is non-linear on both sides, is employed for adjusting the amplification in the return line 6. The influencing magnitude is variable within wide limits with the two $x_p$-adjusters 14 and 16. The thus-described process can be adapted to any non-linear functional curve.

The above-disclosed process for the continuous automatic alteration of the amplification of a control device in dependence on the control deviation and adaptable to non-linear curves of control systems, wherein the non-linearity is present on the positive as well as on the negative side of the straight line extending through the center of the above-mentioned curve, represents the sole possibility for obtaining flawless control. The process is characterized in that a second control device exhibiting the same control deviation as the first control system, as an input signal, varies the amplification from the first control system by way of non-linear members.

While I have shown and described one embodiment in accordance with the present invention, it is understood that the same is not limited thereto but is susceptible of numerous changes and modifications as known to a person skilled in the art, and I therefore do not wish to be limited to the details shown and described herein but intend to cover all such changes and modifications as are obvious to one of ordinary skill in the art.

What is claimed is:

1. Apparatus for effecting control over control systems for non-linear control operations, comprising
a main control system including means generating a measured value signal representing a condition of a controlled operation, means for comparing said measured value signal with a desired value signal to provide an error signal, and a control device responsive to said error signal for regulating said controlled operation, and
a secondary control system including means responsive to said measured value signal and said desired value signal for regulating the operating characteristics of said control device in said main control system to maintain the operating point of said main control system constant in the case of non-linear controlled operations, wherein said secondary control system includes first and second chopper amplifiers, additional means for comparing said measured value signal with said desired value signal to provide an error signal which is applied to the inputs of said first and second chopper amplifiers, first and second desired value signal generators connected to the inputs of said first and second chopper amplifiers, respectively, to apply desired value signals thereto, and servo control means responsive to the outputs of said first and second chopper amplifiers for regulating an operating characteristic of said control device, and wherein said servo control means includes a servometer connected to the outputs of said first and second chopper amplifiers, first and second feedback signal potentiometers driven by said servomotor and electrically connected to said first and second desired value signal generators, respectively, and an adjusting potentiometer driven by said servomotor and providing a control signal to said control device in said main control system.

2. Apparatus as defined in claim 1, wherein said first feedback signal potentiometer is constructed to provide a variable resistance which is linear with movement of the sliding contact by said servomotor.

3. Apparatus as defined in claim 1, wherein said second feedback signal potentiometer is constructed to provide a central output tap connected to said second desired value signal generator.

4. Apparatus as defined in claim 1, wherein said adjusting potentiometer has a central output tap and a sliding contact driven by said servomotor, said sliding contact being electrically connected to the ends of said potentiometer.

5. Apparatus as defined in claim 4, wherein said control device includes a variable gain amplifier having one input receiving said error signal from said comparing means and a second input connected to the output of a servo amplifier, the output of said vairable gain amplifier being connected to one input of said servo amplifier and the central output tap of said adjusting potentiometer being connected to another input of said servo amplifier.

6. Apparatus as defined in claim 5, wherein said first feedback signal potentiometer is constructed to provide a variable resistance which is linear with movement of the sliding contact by said servomotor.

7. Apparatus as defined in claim 6, wherein said second feedback signal potentiometer is constructed to provide a central output tap connected to said second desired value signal generator.

* * * * *